US010153634B2

(12) United States Patent
Tozawa et al.

(10) Patent No.: US 10,153,634 B2
(45) Date of Patent: Dec. 11, 2018

(54) SWITCH BOX AND OVERCURRENT PREVENTING METHOD

(71) Applicant: YAZAKI CORPORATION, Tokyo (JP)

(72) Inventors: Norihiro Tozawa, Shizuoka (JP); Takashi Sakabe, Shizuoka (JP); Akira Serizawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 255 days.

(21) Appl. No.: 15/181,133

(22) Filed: Jun. 13, 2016

(65) Prior Publication Data

US 2017/0018920 A1 Jan. 19, 2017

(30) Foreign Application Priority Data

Jul. 17, 2015 (JP) .................................. 2015-143403

(51) Int. Cl.
*H02H 7/20* (2006.01)
*H02H 3/05* (2006.01)
*H02H 1/00* (2006.01)
*H01H 83/14* (2006.01)
*H02P 29/024* (2016.01)
*H01H 83/22* (2006.01)

(52) U.S. Cl.
CPC .......... *H02H 7/205* (2013.01); *H02H 1/0015* (2013.01); *H02H 3/05* (2013.01); *H01H 83/144* (2013.01); *H01H 83/226* (2013.01); *H02P 29/027* (2013.01)

(58) Field of Classification Search
USPC ...................................... 361/42–50
See application file for complete search history.

(56) References Cited

U.S. PATENT DOCUMENTS

| 2010/0194381 A1 | 8/2010 | Ito et al. | |
| 2010/0259255 A1* | 10/2010 | Hashio | G01R 15/207 324/244 |
| 2010/0327654 A1 | 12/2010 | Azuma et al. | |
| 2011/0050219 A1 | 3/2011 | Krella et al. | |

(Continued)

FOREIGN PATENT DOCUMENTS

| JP | 9-47034 A | 2/1997 |
| JP | 2005-172716 A | 6/2005 |

(Continued)

OTHER PUBLICATIONS

Japanese Office Action for the related Japanese Patent Application No. 2015-143403 dated Jul. 18, 2017.

*Primary Examiner* — Danny Nguyen
(74) *Attorney, Agent, or Firm* — Kenealy Vaidya LLP

(57) ABSTRACT

A switch box includes a circuit substrate having a conductor pattern, a switching element that is mounted on the circuit substrate, a bus bar having a current input and output portion formed at one end thereof and a mounting portion formed at the other end thereof, the mounting portion being connected to the conductor pattern of the circuit substrate so as to be electrically conducted to the switching element through the conductor pattern, and a magnetic sensor that is mounted on the circuit substrate to detect a magnetic field generated due to a current flowing into the bus bar. The magnetic sensor is disposed in a gap formed between the circuit substrate and the bus bar.

6 Claims, 19 Drawing Sheets

(56) References Cited

U.S. PATENT DOCUMENTS

| | | | | |
|---|---|---|---|---|
| 2013/0265041 A1* | 10/2013 | Friedrich | ............ | G01R 15/207 324/260 |
| 2014/0226242 A1* | 8/2014 | Schripsema | ......... | H02H 1/0015 361/63 |
| 2015/0022196 A1* | 1/2015 | Hebiguchi | ........... | G01R 15/207 324/244 |

FOREIGN PATENT DOCUMENTS

| | | |
|---|---|---|
| JP | 2005-204375 A | 7/2005 |
| JP | 2005-321206 A | 11/2005 |
| JP | 2010-175474 A | 8/2010 |
| JP | 2011-15460 A | 1/2011 |
| JP | 2013-198318 A | 9/2013 |

\* cited by examiner

SWITCH BOX AND OVERCURRENT PREVENTING METHOD

CROSS REFERENCE TO RELATED APPLICATIONS

This application is based on Japanese Patent Application (No. 2015-143403) filed on Jul. 17, 2015, the contents of which are incorporated herein by reference.

BACKGROUND OF THE INVENTION

1. Field of the Invention

The present invention relates to a switch box provided in a power supply system etc. of a vehicle, and an overcurrent preventing method.

2. Description of the Related Art

For example, a power supply system for a vehicle is provided with a main battery and a second battery which is a spare battery for backup. In the power supply system, a switch box including a switching element is provided between the main battery and the second battery, and supply of a current from the second battery is controlled by the switching element of the switch box (for example, see JP-A-2013-198318).

When an overcurrent flows into the switching element inside the switch box, there is a fear that the switching element may be damaged. Therefore, in the switch box, a shunt resistor is provided to monitor a voltage drop in the switching element to detect an overcurrent. Thus, the switching element can be turned OFF before the switching element is damaged. Although it may be considered that an overcurrent can be therefore prevented from flowing into the switching element, the provision of the shunt resistor leads to increase in size of the switch box. In addition, due to the shunt resistor serving as a heat generating component, there is a fear that temperature requirement cannot be satisfied. In addition, it may be also considered that a current sensor such as a current transformer for detecting a current flowing into the switching element is provided to monitor a current value detected by the current sensor to thereby prevent an overcurrent from flowing into the switching element. Also in this case, there is a problem that the size of the switch box may be increased due to the provision of the current sensor.

SUMMARY OF THE INVENTION

The invention has been accomplished in consideration of the aforementioned circumstances. An object of the invention is to provide a switch box which can detect a current flowing into a switching element with high accuracy without increasing the size to thereby protect the switching element, and an overcurrent preventing method.

In order to achieve the aforementioned object, the switch box according to the invention is characterized in the following paragraphs (1) to (5).

(1) A switch box comprising:
a circuit substrate that comprises a conductor pattern;
a switching element that is mounted on the circuit substrate;
a bus bar that comprises a current input and output portion formed at one end thereof and a mounting portion formed at the other end thereof, the mounting portion being connected to the conductor pattern of the circuit substrate so as to be electrically conducted to the switching element through the conductor pattern; and
a magnetic sensor that is mounted on the circuit substrate to detect a magnetic field generated due to a current flowing into the bus bar,
wherein the magnetic sensor is disposed in a gap formed between the circuit substrate and the bus bar.

(2) The switch box according to the paragraph (1), wherein the switching element and other switching element are mounted on the circuit substrate;
wherein the mounting portion of the bus bar comprises a plurality of branch connection portions which are electrically conducted to the switching element and the other switching element through the conductor pattern; and
wherein the magnetic sensor is disposed so as to be closer to the current input and output portion than the branch connection portions.

(3) The switch box according to the paragraph (1) or (2), wherein the bus bar comprises a bent portion which is provided between the current input and output portion and the mounting portion and bent perpendicularly to a direction parallel to the current input and output portion and the mounting portion; and
wherein the magnetic sensor is disposed in a vicinity of the bent portion.

(4) The switch box according to any one of the paragraphs (1) through (3), further comprising:
a plurality of shield plates that are comprised of a magnetic material and cover the magnetic sensor, the bus bar and the circuit substrate.

(5) The switch box according to the paragraph (1) or (2), wherein the bus bar and other bus bar are mounted on the circuit substrate so as to be disposed in parallel with one another; and
wherein at least one of the bus bar and the other bus bar has a side extension portion which extends in a direction perpendicular to an extension direction of the at least one of the bus bar and the other bus bar and an end portion of the side extension portion is the current input and output portion.

In the switch box having the aforementioned configuration (1), a current value of the current flowing into the bus bar can be obtained based on a detection signal output from the magnetic sensor so that an overcurrent flowing into the switching element can be determined. Thus, the current flowing into the switching element can be blocked to thereby prevent the switching element from being damaged due to the overcurrent.

In addition, the magnetic sensor is mounted on the circuit substrate while being disposed in the gap between the circuit substrate and the bus bar. The gap is formed when the bus bar is mounted on the circuit substrate. Thus, increase of the size can be suppressed.

That is, the current flowing into the switching element can be detected with high accuracy without changing the structure or increasing the size. Accordingly, the switching element can be protected.

In the switch box having the aforementioned configuration (2), a large current flows stably not in the branch connection portions but on the side of the current input and output portion so that the magnetic flux density of a magnetic field generated due to the large current can be also large. Accordingly, since the magnetic sensor is disposed not in the branch connection portions but on the side of the current input and output portion, the magnetic field can be detected surely by the magnetic sensor without using any magnetic collection member etc. made of a magnetic substance material. Thus, an error in detection of the current can be suppressed.

In the switch box having the aforementioned configuration (3), the magnetic sensor is disposed in the vicinity of the bent portion where the magnetic flux density of the magnetic field generated when the current flows becomes large. Accordingly, the magnetic field can be detected more surely by the magnetic sensor so that an error in detection of the current can be suppressed more greatly. In addition, a dimensional error between the current input and output portion and the mounting portion can be absorbed by the bent portion.

In the switch box having the aforementioned configuration (4), the magnetic sensor is covered with the shield plates, the bus bar and the circuit substrate. Accordingly, even when, for example, a cable or a vehicle body is disposed in the vicinity of the switch box, the magnetic field generated due to the current flowing into the bus bar can be stabilized. Thus, the influence of noise can be suppressed as much as possibly so that the magnetic field can be detected surely by the magnetic sensor. Thus, an error in detection of the current can be suppressed.

In the switch box having the aforementioned configuration (5), for example, a mounting position of the magnetic sensor is selected between the side extension portion of the bus bar having the side extension portion and the circuit substrate or between the bus bar having no side extension portion and the circuit substrate in accordance with the direction of an external magnetic field generated due to a current flowing into a cable arranged in the vicinity of the switch box. Accordingly, the influence of the external magnetic field can be reduced so that detection accuracy of an overcurrent can be enhanced.

In addition, the position of the current input and output portion of the bus bar having the side extension portion and the position of the current input and output portion of the bus bar having no side extension portion are different from each other. Accordingly, it is not necessary to use an irregular terminal having a large size and a complicated shape or it is not necessary to change external appearance of a housing. Therefore, the cost can be prevented from increasing. Thus, the switch box can be easily installed in an installation space of a vehicle which varies in size from one vehicle kind to another, and a large-diameter cable can be connected to the current input and output portion.

Thus, it is possible to provide a switch box having a current input and output portion so that lowering of overcurrent detection accuracy due to an external magnetic field can be suppressed, the degree of freedom in routing a connecting cable can be enhanced, and the switch box can be further compatible with various kinds of vehicles.

In order to achieve the aforementioned object, the overcurrent preventing method according to the invention is characterized in the following paragraph (6).

(6) An overcurrent preventing method in a switch box comprising:

a circuit substrate that comprises a conductor pattern;

a switching element that is mounted on the circuit substrate;

a bus bar that comprises a current input and output portion formed at one end thereof and a mounting portion formed at the other end thereof, the mounting portion being connected to the conductor pattern of the circuit substrate so as to be electrically conducted to the switching element through the conductor pattern; and a magnetic sensor that is mounted on the circuit substrate to detect a magnetic field generated due to a current flowing into the bus bar, the overcurrent preventing method comprising:

blocking a current from flowing into the switching element, when the current having a current value equal to or greater than a predetermined value flows into the bus bar for at least a predetermined time based on a detection result output from the magnetic sensor.

According to the overcurrent preventing method having the aforementioned configuration (6), the current value of the current flowing into the bus bar can be obtained based on a direction signal issued from the magnetic sensor so that an overcurrent can be prevented surely from flowing into the switching element. Thus, the switching element can be protected.

According to the invention, it is possible to provide a switch box which can detect a current flowing into a switching element with high accuracy without increasing the size to thereby protect the switching element, and an overcurrent preventing method.

The invention has been described above briefly. When undermentioned embodiments (hereinafter referred to as "embodiments") for carrying out the invention are read through with reference to the accompanying drawings, details of the invention can be made further clear.

DETAILED DESCRIPTION OF THE EXEMPLARY EMBODIMENTS

Specific embodiments according to the invention will be described below with reference to the respective drawings.
(First Embodiment)

Figure 1:
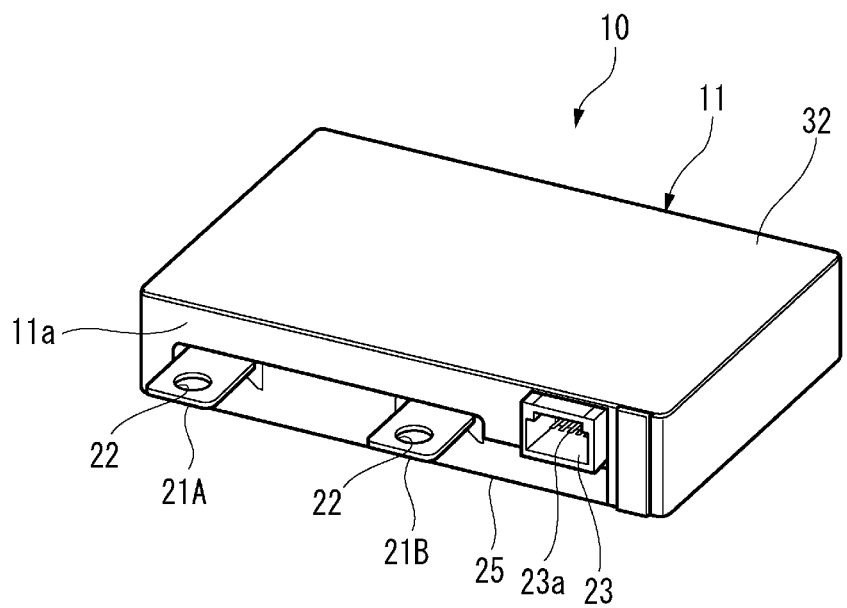
FIG. 1 is a perspective view of a switch box according to a first embodiment.

FIG. 1 is a perspective view of a switch box according to a first embodiment.

As shown in FIG. 1, the switch box 10 according to the embodiment has a housing 11 shaped like a rectangular parallelepiped. The switch box 10 is incorporated and used, for example, in a power supply system of a vehicle such as a car.

The switch box 10 has two connection terminal portions (current input and output portions) 21A and 21B exposed in a front portion 11a of the housing 11. Terminal portions of a connection partner are fastened and connected to the connection terminal portions 21A and 21B with bolts. Bolt insertion holes 22 are formed in the connection terminal portions 21A and 21B so that the bolts for fastening the connection terminal portions 21A and 21B to the terminal portions of the connection partner can be inserted through the bolt insertion holes 22.

In addition, a connector 23 is provided in the front portion 11a of the housing 11. A fitting recess 23a of the connector 23 is exposed in the front portion 11a. A partner connector provided in a control line of a wire harness is fitted and connected into the connector 23.

The housing 11 is constituted by a lower casing 31 and an upper casing 32. The upper casing 32 is detachably attached to the lower casing 31.

Figure 2:
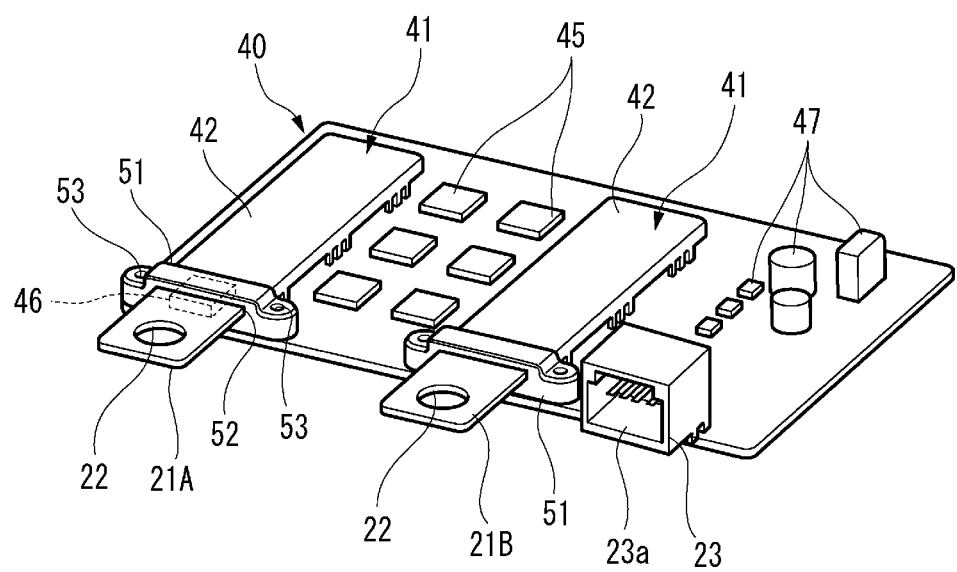
FIG. 2 is a perspective view of a circuit substrate received in a housing.

FIG. 2 is a perspective view of a circuit substrate received in the housing.

As shown in FIG. 2, the circuit substrate 40 having a conductor pattern is received in the housing 11 of the switch box 10. Two bus bars 41 are mounted on the circuit substrate 40. End portions of the bus bars 41 are provided as the connection terminal portions 21A and 21B having the bolt insertion holes 22. In addition, the connector 23 is also mounted on the circuit substrate 40.

Switching elements 45 and magnetic sensors 46 are mounted on the circuit substrate 40. In addition, other electronic components 47 than the switching elements 45 and the magnetic sensors 46 are also mounted on the circuit substrate 40. Each of the switching elements 45 is a semiconductor element such as an MOSFET.

Figure 3:
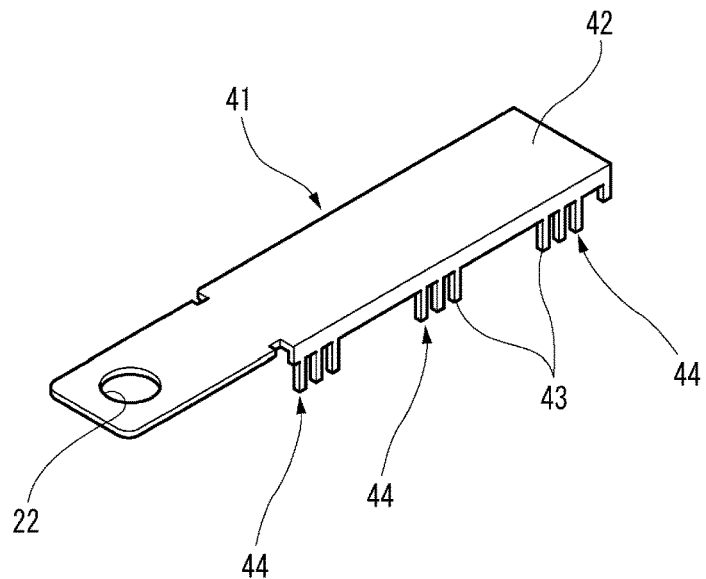
FIG. 3 is a perspective view of a bus bar.
Figure 4A:
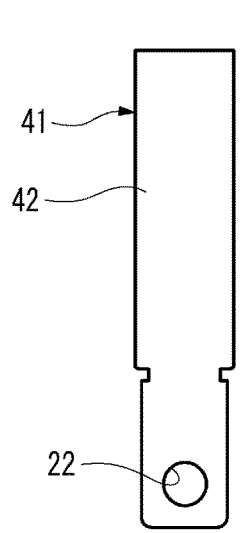
FIGS. 4A to 4C are views showing the bus bar, FIG. 4A being a plan view of the bus bar, FIG. 4B being a side view of the bus bar, FIG. 4C being a front view of the bus bar.
Figure 4B:
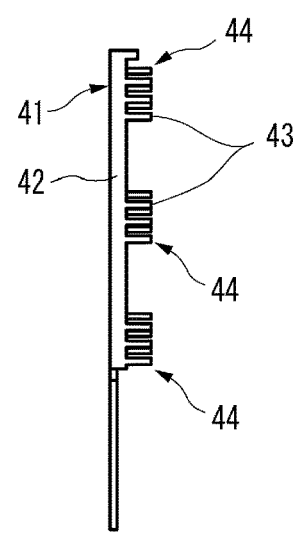
Figure 4C:
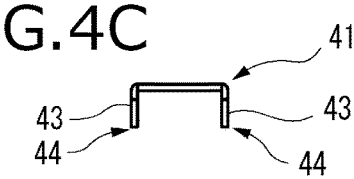

FIG. 3 is a perspective view of the bus bar. FIGS. 4A to 4C are views showing the bus bar. FIG. 4A is a plan view of the bus bar. FIG. 4B is a side view of the bus bar. FIG. 4C is a front view of the bus bar.

As shown in FIG. 3 and FIGS. 4A to 4C, for example, the bus bar 41 is formed from a metal plate of copper, a copper alloy, aluminum, an aluminum alloy, gold, stainless steel (SUS) etc. The bus bar 41 is formed into a rectangular shape in plan view. In the bus bar 41, the other portion than the one end portion serving as the connection terminal portion 21A, 21B is provided as a mounting portion 42. A plurality of branch connection portions 44 each having a plurality of terminals 43 are formed in opposite side portions of the mounting portion 42. The terminals 43 are bent and extended in one and the same direction. In the example, the branch connection portions 44 are provided at three places in each of the opposite side portions of the mounting portion 42 of the bus bar 41.

The terminals 43 of the branch connection portions 44 are inserted into through holes formed in the circuit substrate 40 and soldered to the conductor pattern of the circuit substrate 40. In this manner, the bus bar 41 is fixed to the circuit substrate 40 while being electrically conducted and connected to the conductor pattern.

A fixation metal fitting 51 is attached to the bus bar 41. The fixation metal fitting 51 has an insertion hole 52 through which the bus bar 41 can be inserted from its one end side. In addition, the fixation metal fitting 51 has screw holes 53 formed in its opposite end portions. When screws which have been inserted from the back side of the circuit substrate 40 into hole portions formed in the circuit substrate 40 are fastened to the screw holes 53, the fixation metal fitting 51 is fixed to the vicinity of an edge portion of the circuit substrate 40. In this manner, the one end side of the bus bar 41 serving as the connection terminal portion 21A, 21B is supported on the circuit substrate 40 by the fixation metal fitting 51.

The pair of bus bars 41 are mounted on the circuit substrate 40 while being disposed in parallel with each other. The switching elements 45 mounted on the circuit substrate 40 are arranged in lines in a longitudinal direction of the bus bars 41 between the bus bars 41 paired with each other.

Figure 5:
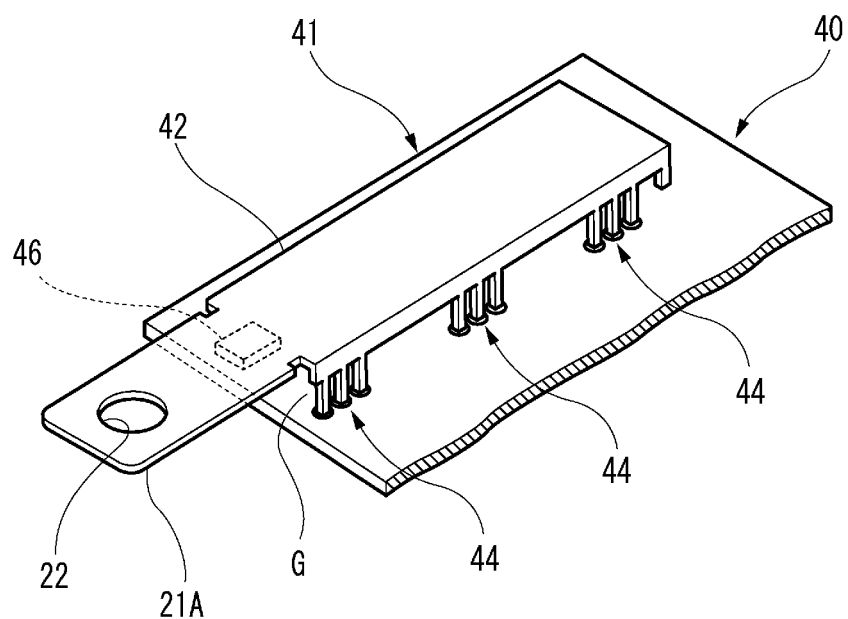
FIG. 5 is a perspective view of a part of the circuit substrate for explaining disposition of a magnetic sensor.
Figure 6:
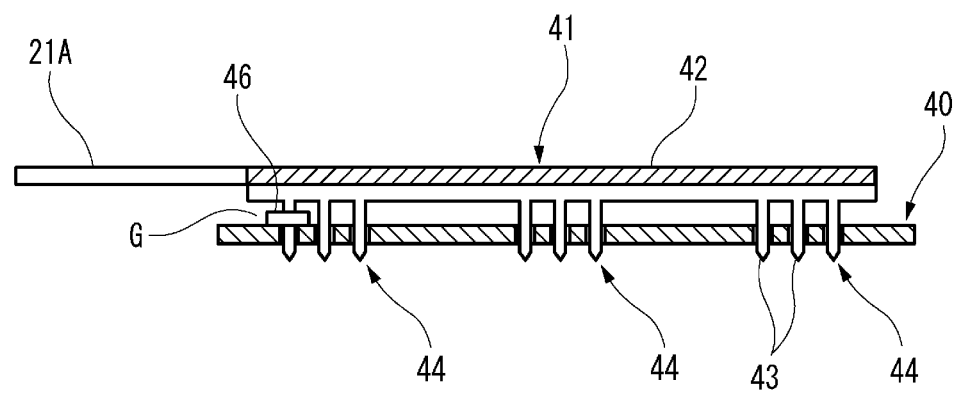
FIG. 6 is a schematic sectional view of the circuit substrate and the bus bar for explaining the disposition of the magnetic sensor.
Figure 7:
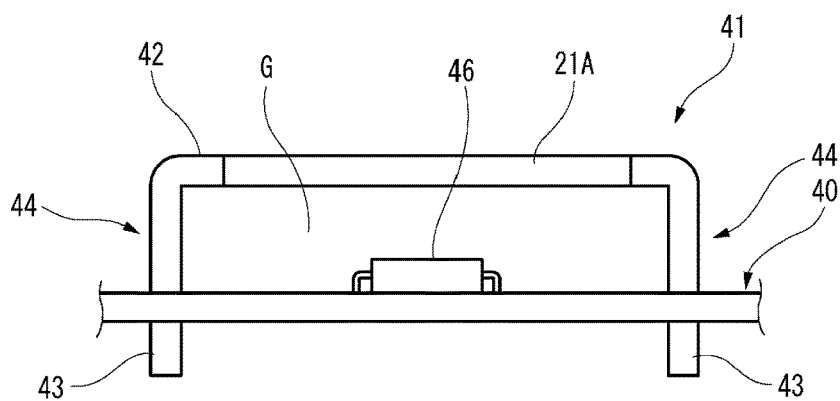
FIG. 7 is a schematic front view observed from a distal end side of the bus bar in the circuit substrate for explaining the disposition of the magnetic sensor.

FIG. 5 is a perspective view of a part of the circuit substrate for explaining disposition of a magnetic sensor. FIG. 6 is a schematic sectional view of the circuit substrate and the bus bar for explaining the disposition of the magnetic sensor. FIG. 7 is a schematic front view observed from a distal end side of the bus bar in the circuit substrate for explaining the disposition of the magnetic sensor.

As shown in FIGS. 5 to 7, the bus bar 41 is mounted on the circuit substrate 40 while a gap G is formed with respect to the circuit substrate 40. The magnetic sensor 46 mounted on the circuit substrate 40 is provided in the gap G between one bus bar 41 (the bus bar 41 on the left side in FIG. 2) and the circuit substrate 40 and disposed in an adjacent position to the bus bar 41. The magnetic sensor 46 is a hall IC provided with a hall element which converts magnetic force into an electric signal by use of a hall effect and outputs the converted electric signal. The magnetic sensor 46 is disposed in a position opposed to the bus bar 41 not in the branch connection portions 44 of the bus bar 41 but on the side of the connection terminal portion 21A, 21B. The magnetic sensor 46 converts magnetic force generated around the bus bar 41 due to a current flowing into the bus bar 41 into an electric signal, and outputs the converted electric signal.

In the switch box 10 having the aforementioned configuration, the switching elements 45 mounted between the bus bar 41 having its one end used as the connection terminal portion 21A and the bus bar 41 having its one end used as the connection terminal portion 21B are electrically conducted to each other through the conductor pattern. A switch portion is constituted by the switching elements 45. A circuit between the connection terminal portions 21A and 21B is controlled to be opened/closed by the switch portion. In the switch box 10, ON/OFF of the switch portion is controlled by a control signal which is transmitted from a control portion controlling the power supply system, through the control line connected to the connector 23. The switch box 10 is provided between a main battery and a second battery constituting the power supply system of the vehicle and the circuit between the connection terminal portions 21A and 21B is closed by the switch portion so that a current can be supplied from the second battery.

On this occasion, a control portion controlling the switch box 10 obtains a current value flowing into the bus bar 41 based on an electric signal from the magnetic sensor 46 of the switch box 10 in order to monitor the current value. When a current having a current value not lower than a predetermined value which is a threshold flows into the bus bar 41 continuously for a predetermined time, the control portion determines that an overcurrent flows into the switching elements 45. In accordance with the determination, the control portion turns OFF the switch portion. Thus, the overcurrent can be prevented from flowing into the switching elements 45. Incidentally, when any of the switching elements 45 is damaged, the control portion such as a microcomputer mounted on the circuit substrate 40 determines that the switching element 45 is out of order. Then, the control portion sets a current value corresponding to the number of normal switching elements 45 as the threshold to thereby determine whether there is an overcurrent or not.

Thus, according to the switch box 10 and the overcurrent preventing method according to the first embodiment, an overcurrent flowing into the switching elements 45 can be determined based on an electric signal which is a detection signal issued from the magnetic sensor 46. Accordingly, the current flowing into the switching elements 45 can be blocked to thereby prevent the switching elements 45 from being damaged due to the overcurrent. Thus, the switching elements 45 can be protected.

In addition, the magnetic sensor 46 is mounted on the circuit substrate 40 while being disposed inside the gap G between the circuit substrate 40 and the bus bar 41. The gap G is formed when the bus bar 41 is mounted on the circuit substrate 40. Accordingly, increase of the size can be suppressed in comparison with the case where a shunt resistor or a current sensor is used. In addition, the magnetic sensor 46 is not a heat generating component like a shunt resistor. Accordingly, there is no fear that temperature requirement cannot be satisfied.

That is, the current flowing into the switching elements 45 can be detected with high accuracy without changing the structure or causing the increase of the size. Accordingly, the switching elements 45 can be protected.

Figure 8A:
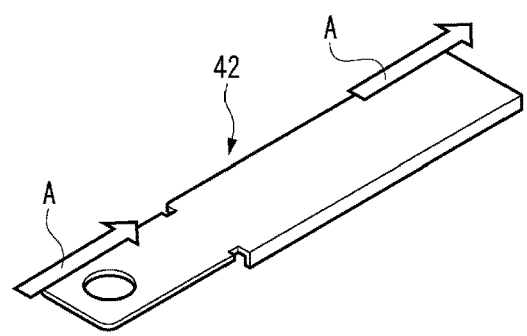
FIGS. 8A and 8B are views showing the flows of currents in bus bars, FIG. 8A being a perspective view of one of the bus bars in which the flow of the current is straight, FIG. 8B being a perspective view of the other bus bar in which the flow of the current is made to shunt in branch connection portions.
Figure 8B:
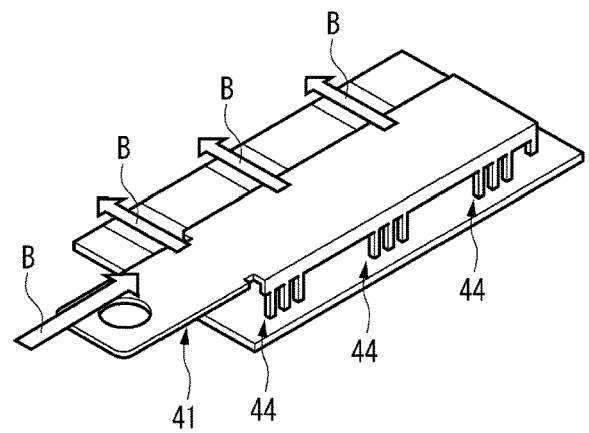
Figure 9:
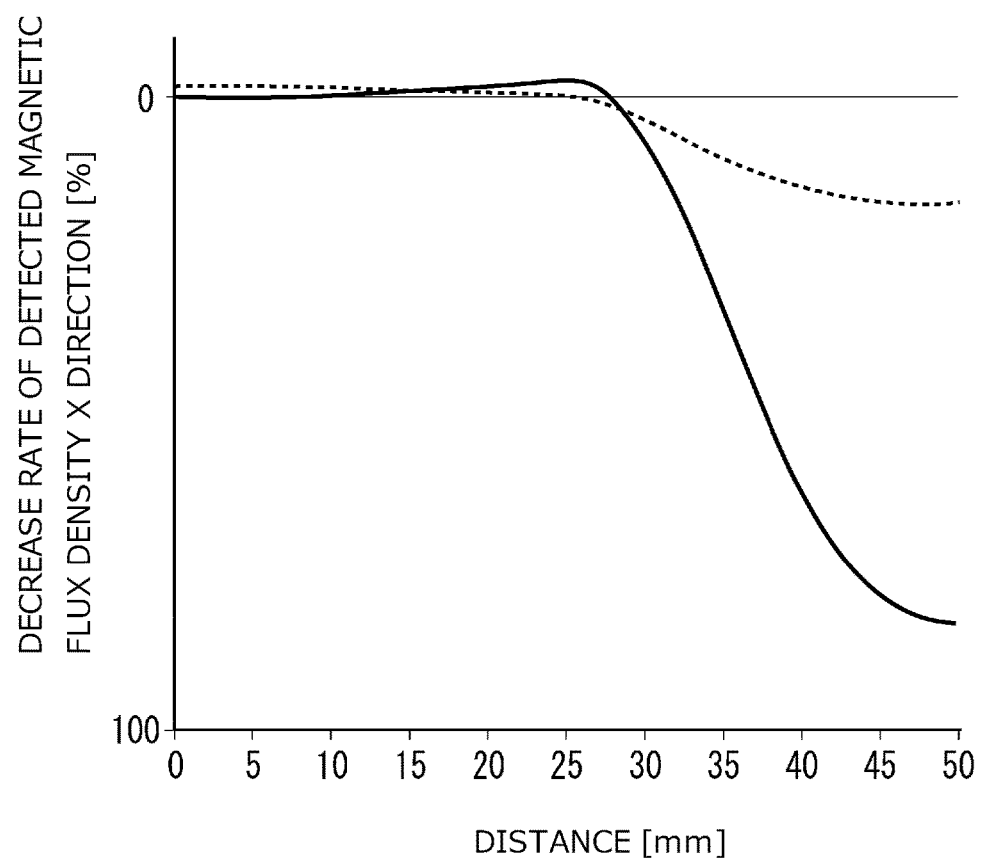
FIG. 9 is a graph showing longitudinal-direction changes of magnetic flux densities generated around the bus bar in which the flow of the current is straight and around the bus bar in which the flow of the current is made to shunt in the branch connection portions.

When a current flows straight from one end of the bus bar 41 toward the other end of the same (see an arrow A in FIG. 8A) as shown in FIG. 8A, the current flows stably in the longitudinal direction. Accordingly, the magnetic flux density of a magnetic field generated around the bus bar 41 does not change so much, as indicated by a dotted line in FIG. 9. On the other hand, when a current flowing into the bus bar 41 shunts sideways in the branch connection portions 44 (see an arrow B in FIG. 8B) as shown in FIG. 8B, a large current flows stably not in the branch connection portions 44 but on the side of the connection terminal portion 21A. However, since the large current is made to shunt in the branch connection portions 44, the magnetic flux density of a magnetic field generated around the bus bar 41 changes to decrease largely in the branch connection portions 44, as indicated by a solid line in FIG. 9.

In the embodiment, the magnetic sensor 46 is disposed not in the branch connection portions 44 but on the side of the connection terminal portion 21A where the magnetic flux density of a magnetic field generated due to a large current flowing stably is also large stably. Accordingly, the magnetic field can be detected surely by the magnetic sensor 46, for example, without using any magnetic collection member etc. which is made of a magnetic substance material. Thus, an error in detection of the current can be suppressed.

(Second Embodiment)

Next, a second embodiment will be described. Incidentally, the same constituent parts as those in the first embodiment will be referred to by the same signs respectively and correspondingly and description thereof will be omitted.

Figure 10:
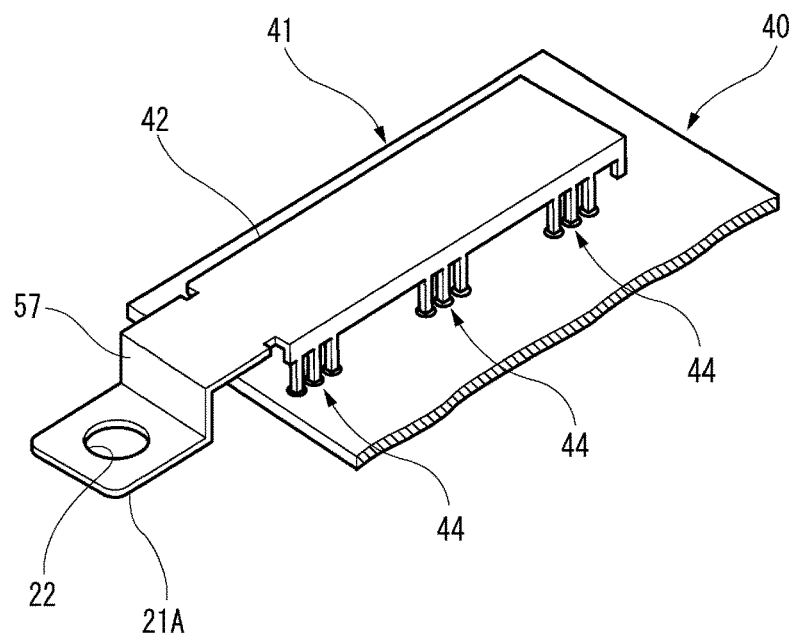
FIG. 10 is a perspective view of a bus bar mounted on a circuit substrate for explaining a second embodiment.
Figure 11:
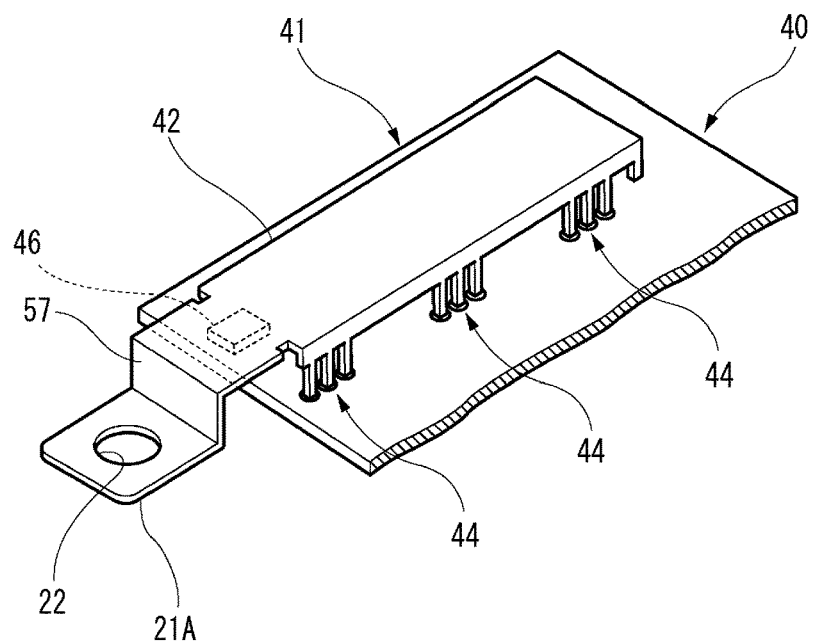
FIG. 11 is a perspective view of a part of the circuit substrate for explaining disposition of a magnetic sensor.
Figure 12:
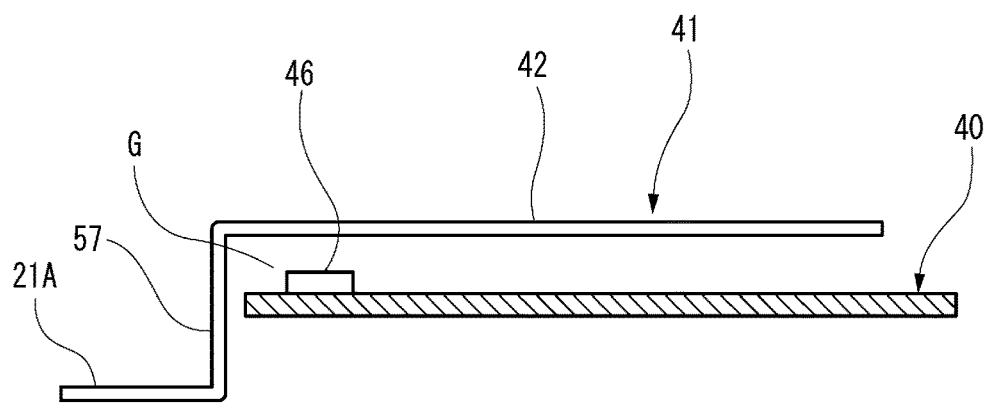
FIG. 12 is a schematic sectional view of the circuit substrate and the bus bar for explaining the disposition of the magnetic sensor.
Figure 13:
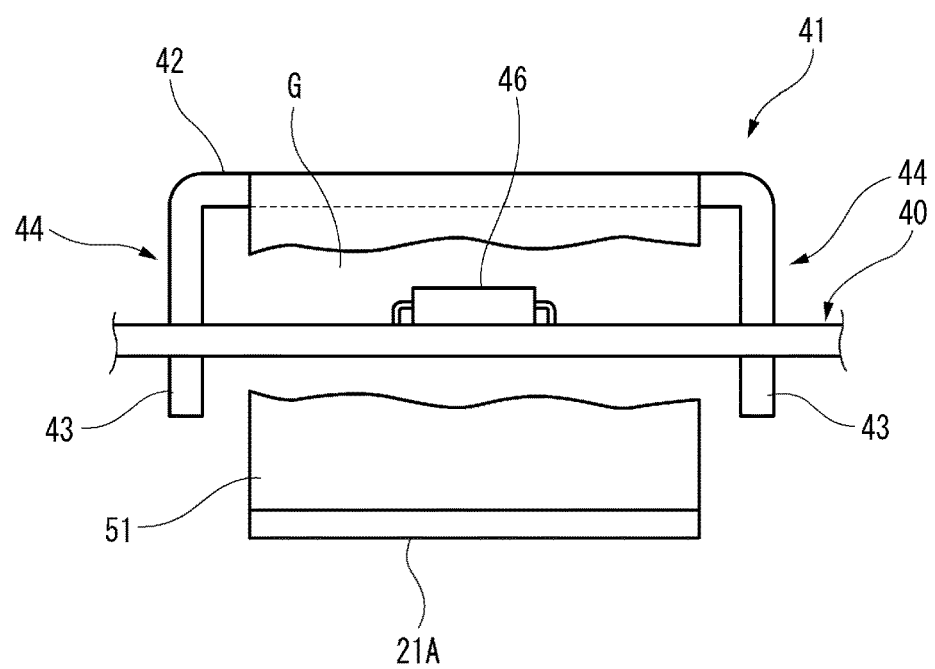
FIG. 13 is a schematic front view observed from a distal end side of the bus bar in the circuit substrate for explaining the disposition of the magnetic sensor.

FIG. 10 is a perspective view of a bus bar mounted on a circuit substrate for explaining the second embodiment. FIG. 11 is a perspective view of a part of the circuit substrate for explaining disposition of a magnetic sensor. FIG. 12 is a schematic sectional view of the circuit substrate and the bus bar for explaining the disposition of the magnetic sensor. FIG. 13 is a schematic sectional view observed from a distal end side of the bus bar in the circuit substrate for explaining the disposition of the magnetic sensor.

As shown in FIGS. 10 to 13, in a switch box 10 according to the second embodiment, a bent portion 57 is formed between a connection terminal portion 21A and a mounting portion 42 of the bus bar 41. The bent portion 57 is bent perpendicularly to a direction parallel to the connection terminal portion 21A and the mounting portion 42. Specifically, the bent portion 57 is formed as follows. That is, a side of the mounting portion 42 is bent down toward the circuit substrate 40. At a place where the bent side of the mounting portion 42 reaches the lower surface side of the circuit substrate 40, the bent side of the mounting portion 42 is further bent toward the distal end away from the circuit substrate 40. The magnetic sensor 46 mounted on the circuit substrate 40 is disposed in the vicinity of the bent portion 57 which is the end portion of the mounting portion 42. Specifically, the magnetic sensor 46 is disposed within 10 mm from the bent portion 57.

Figure 14:
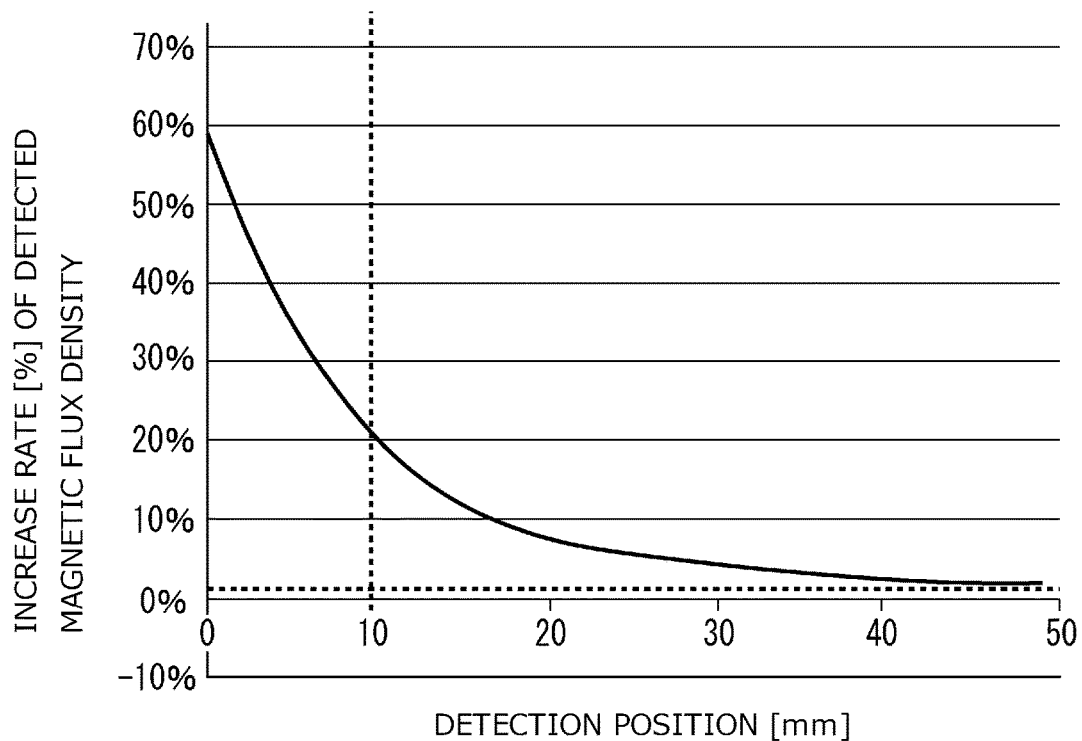
FIG. 14 is a graph showing an increase rate of detected magnetic flux density relative to a longitudinal-direction detection position in a mounting portion of the bus bar.

Here, as shown in FIG. 14, in a bus bar 41 provided with no bent portion 57, detected magnetic flux density has little increase or little decrease in the longitudinal direction of the mounting portion 42 (see a dotted line in FIG. 14). On the other hand, in the bus bar 41 in which the bent portion 57 is formed, detected magnetic flux density increases in the mounting portion 42 largely toward the bent portion 57 (see a solid line in FIG. 14). Particularly, in a range in which the distance from the bent portion 57 is within 10 mm, the increase rate of the detected magnetic flux density becomes large.

In the switch box 10 according to the second embodiment, the magnetic sensor 46 is disposed in the vicinity of the bent portion 57 in which the magnetic flux density of a magnetic field generated when a current flows becomes large. Accordingly, the magnetic field can be detected more surely by the magnetic sensor 46 so that an error in detection of the current can be suppressed more greatly. Particularly, since the magnetic sensor 46 is disposed within 10 mm from the bent portion 57 where the increase rate of the detected magnetic flux density becomes large, the magnetic field can be detected surely by the magnetic sensor 46. In addition, a dimensional error between the connection terminal portion 21A and the mounting portion 42 can be absorbed by the bent portion 57.

(Third Embodiment)

Next, a third embodiment will be described. Incidentally, the same constituent parts as those in the first embodiment will be referred to by the same signs respectively and correspondingly and description thereof will be omitted.

Figure 15:
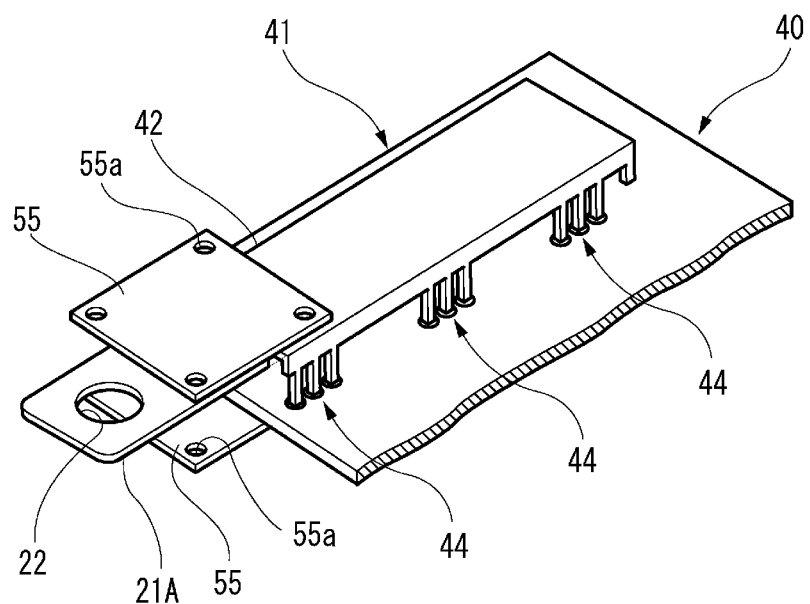
FIG. 15 is a perspective view of a bus bar mounted on a circuit substrate for explaining a third embodiment.
Figure 16:
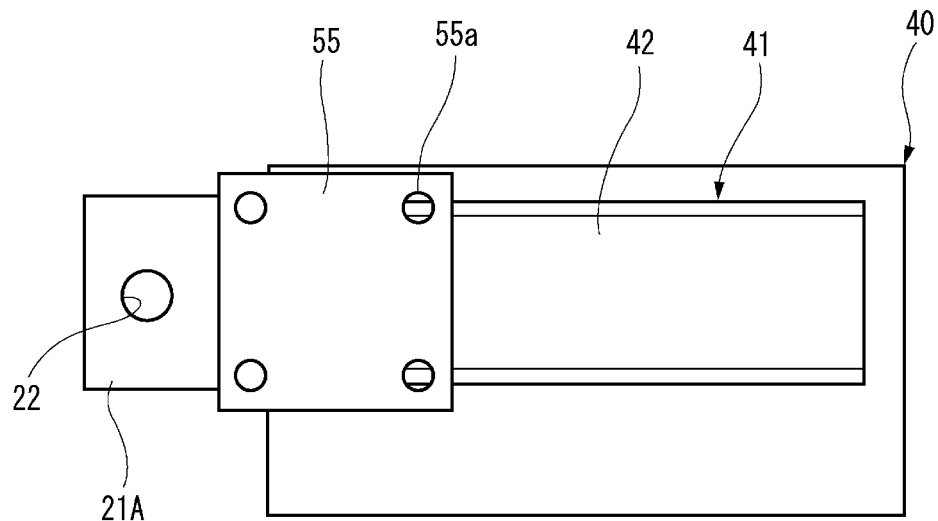
FIG. 16 is a plan view of the bus bar mounted on the circuit substrate for explaining disposition of shield plates.
Figure 17:
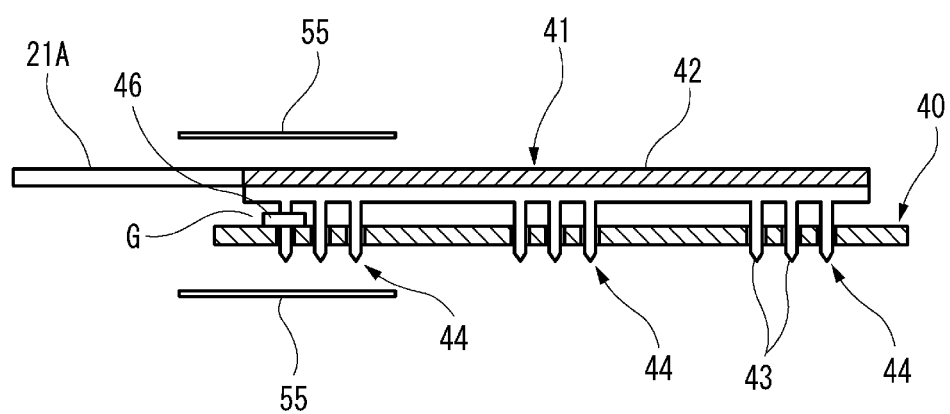
FIG. 17 is a schematic sectional view of the circuit substrate and the bus bar for explaining the disposition of the shield plates.
Figure 18:
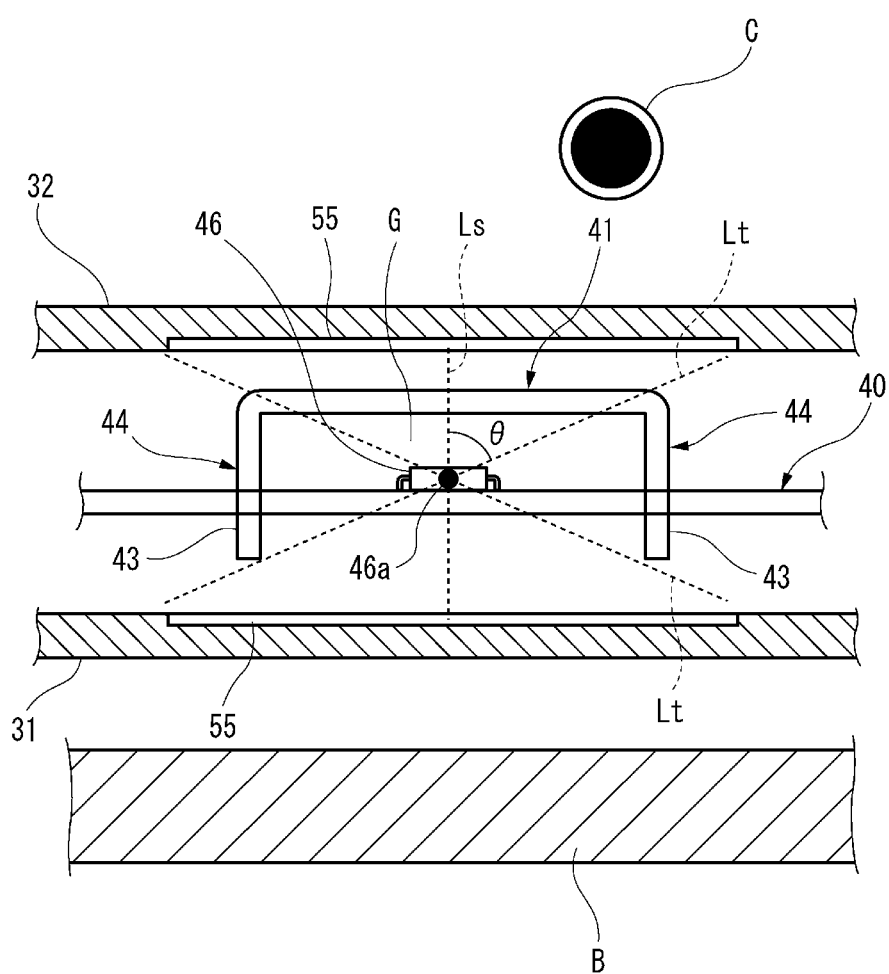
FIG. 18 is a schematic front view observed from a distal end side of the bus bar in the circuit substrate for explaining the disposition of the shield plates.

FIG. 15 is a perspective view of a bus bar mounted on a circuit substrate for explaining the third embodiment. FIG. 16 is a plan view of the bus bar mounted on the circuit substrate for explaining disposition of shield plates. FIG. 17 is a schematic sectional view of the circuit substrate and the bus bar for explaining the disposition of the shield plates. FIG. 18 is a schematic front view observed from a distal end side of the bus bar in the circuit substrate for explaining the disposition of the shield plates.

As shown in FIGS. 15 to 18, in a switch box 10 according to the third embodiment, the pair of shield plates 55 are provided so as to cover a magnetic sensor 46 from above and below. One of the shield plates 55 is disposed above the bus bar 41 while the other shield plate 55 is disposed under the circuit substrate 40. For example, the shield plates 55 are formed out of a magnetic material such as carbon steel, cold rolled steel, ferrite or permalloy. Each of the shield plates 55 is formed into a rectangular shape having hole portions 55a formed in the vicinities of its corner portions respectively. Incidentally, as long as the shield plates 55 have a size large enough to cover the magnetic sensor 46 from above and below, the shape of the shield plates 55 does not have to be limited to the rectangular shape. In addition, the shield plates 55 may be formed into different shapes out of different materials from each other.

The shield plates 55 are provided by insert molding integrally with an upper casing 32 and a lower casing 31 constituting a housing 11. When a resin forming the upper casing 32 and the lower casing 31 enters the hole portions 55a, the shield plates 55 are fixed to the upper casing 32 and the lower casing 31 firmly. Incidentally, the shield plates 55 may be fixed to the bus bar 41 and the circuit substrate 40 directly.

Here, a cable C or a vehicle body B may be disposed in the vicinity of the switch box 10 mounted in a vehicle (see FIG. 18). When the cable C is disposed in the vicinity of the switch box 10, there is a fear that a magnetic field generated when a current flows into the cable C may affect the magnetic sensor 46 to thereby cause an error in detection. On the other hand, when the body B made of metal which is a magnetic material is disposed in the vicinity of the switch box 10, the magnetic field of the bus bar 41 changes because it passes through the body B. Therefore, there is still a fear that an error in detection by the magnetic sensor 46 may be generated.

On the other hand, in the switch box 10 according to the third embodiment, the magnetic field occurring from the cable C in which a current flows mainly passes through one of the shield plates 55. Accordingly, the magnetic field occurring from the cable C can be suppressed from arriving at the magnetic sensor 46 between the shield plates 55. In addition, when the body B etc. made of metal is disposed in the vicinity of the switch box 10, the magnetic field occurring from the bus bar 41 can be suppressed by the shield plates 55 from changing because it passes through the body B.

Thus, according to the switch box 10 according to the third embodiment, the front and back of the magnetic sensor 46 are covered with the pair of shield plates 55 through the bus bar 41 and the circuit substrate 40. Accordingly, even if, for example, the cable C or the vehicle body B is disposed in the vicinity of the switch body 10, the magnetic field generated due to a current flowing into the bus bar 41 can be stabilized. Thus, the influence of noise can be suppressed as much as possible so that the magnetic field can be detected surely by the magnetic sensor 46. Consequently, an error in detection of the current can be suppressed.

When, for example, the shield plates 55 made of cold rolled steel are used, it is preferable that, in sectional view, a magnetic detection point 46a of the magnetic sensor 46 is disposed at an intersection point between diagonal lines Lt connecting opposite side edge portions of the shield plates 55 and an angle θ between each diagonal line Lt and a perpendicular line Ls is set to be not lower than 60°.

Figure 19:
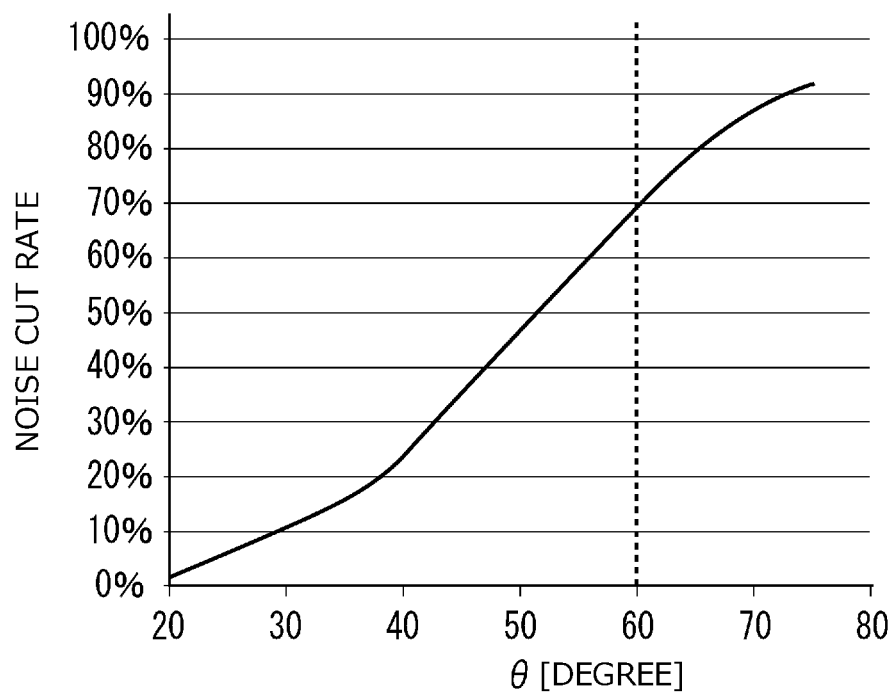
FIG. 19 is a graph showing the relation between the disposition of the shield plates for a magnetic sensor and a noise cut rate.

As shown in FIG. 19, a noise cut rate achieved by provision of the shield plates 55 varies due to the angle θ between the diagonal line Lt and the perpendicular line Ls. When the angle θ is not lower than 60°, the noise cut rate is not lower than 70%. Accordingly, when the angle θ between the diagonal line Lt and the perpendicular line Ls is set to be not lower than 60°, the noise cut rate can be made not lower than 70% so that detection accuracy performed by the magnetic sensor 46 can be enhanced greatly.

(Fourth Embodiment)

Next, a fourth embodiment will be described. Incidentally, the same constituent parts as those in the first embodiment will be referred to by the same signs respectively and correspondingly and description thereof will be omitted.

Figure 20:
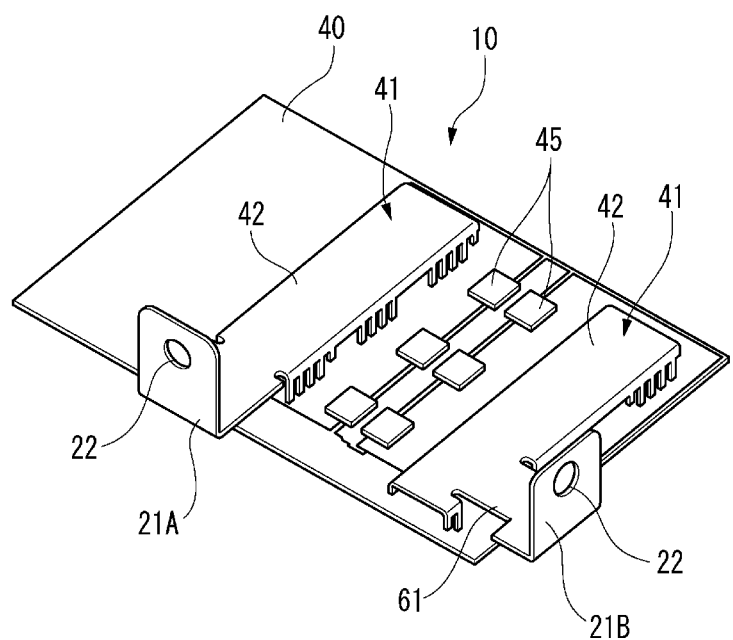
FIG. 20 is a perspective view of a circuit substrate received in a housing for explaining a fourth embodiment.
Figure 21:
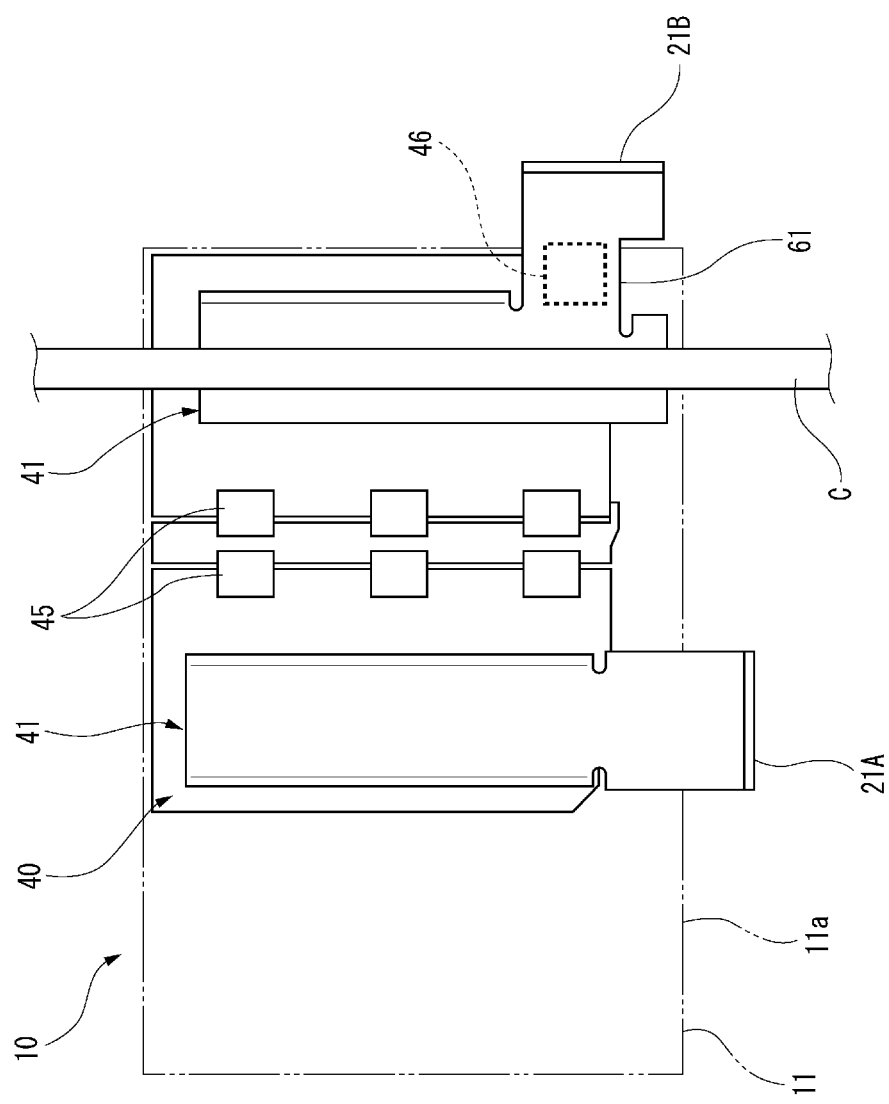
FIG. 21 is a plan view of the circuit substrate received in the housing for explaining the fourth embodiment.
Figure 22:
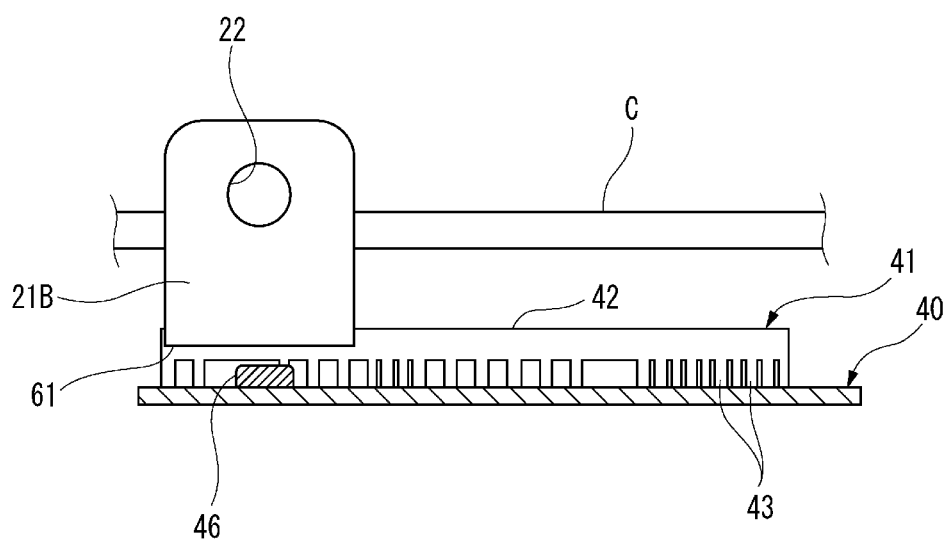
FIG. 22 is a side view of the circuit substrate received in the housing for explaining the fourth embodiment.
Figure 23:
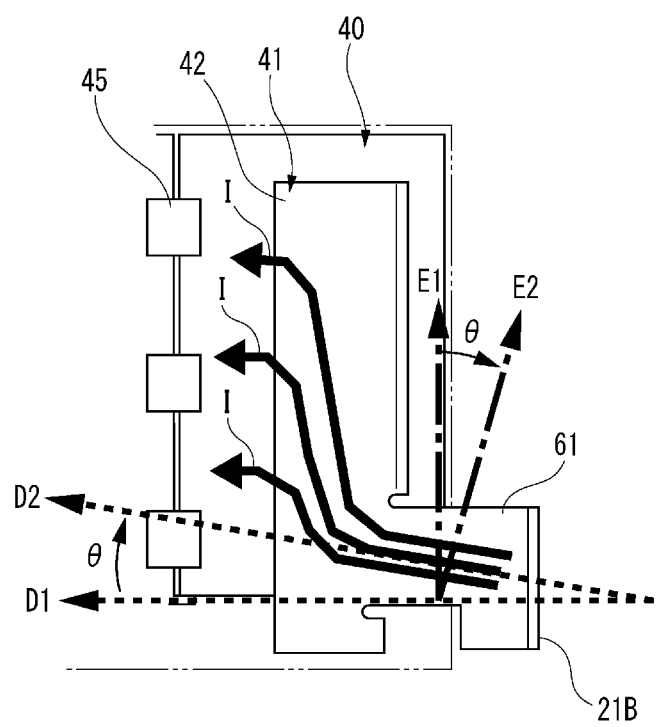
FIG. 23 is a plan view of the circuit substrate for explaining the direction of a current flowing into the bus bar and the direction of a magnetic field.
Figure 24:
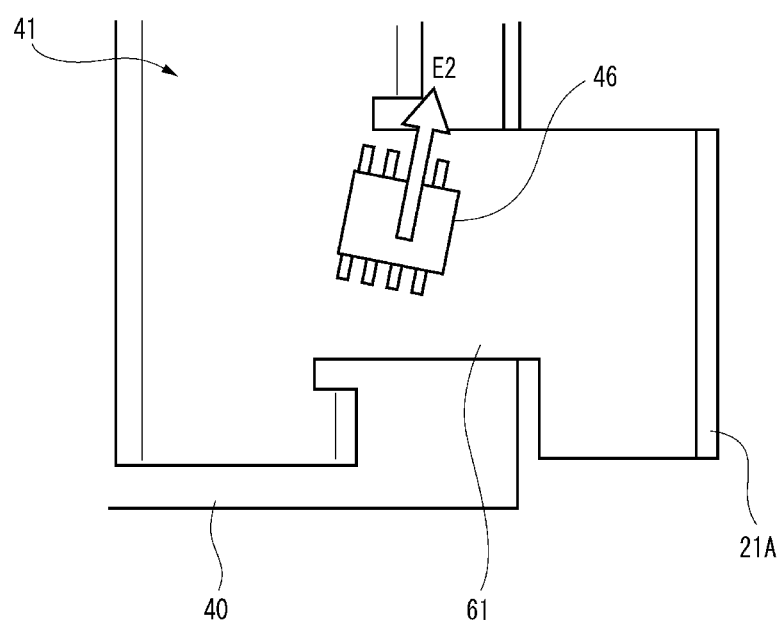
FIG. 24 is a schematic plan view of the bus bar and a magnetic sensor for explaining a mounting position of the magnetic sensor.
Figure 25:
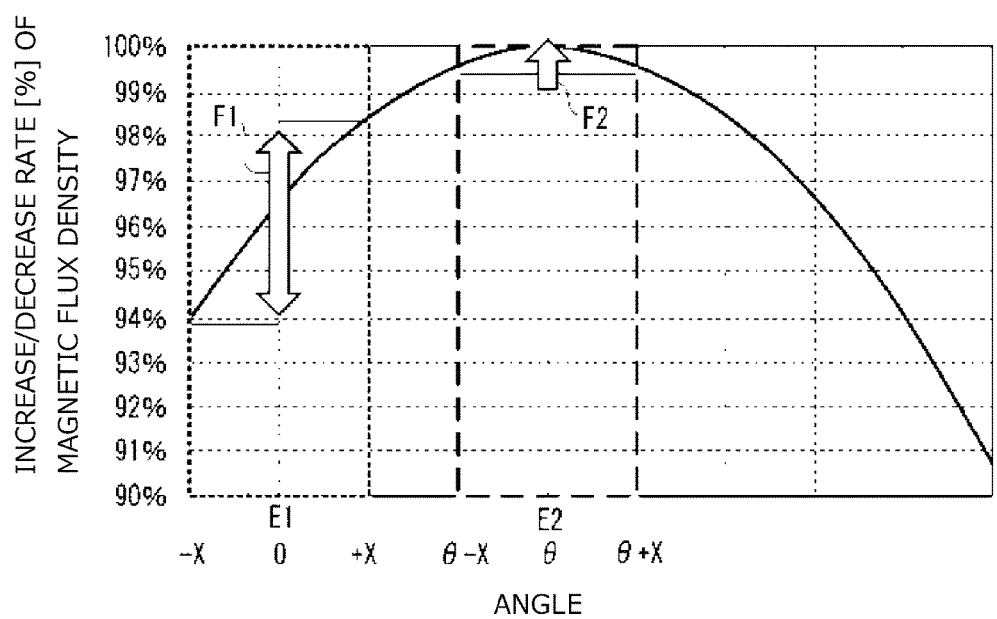
FIG. 25 is a graph showing an increase/decrease rate of the magnetic flux density of a magnetic field generated in a side extension portion of the bus bar.
Figure 26:
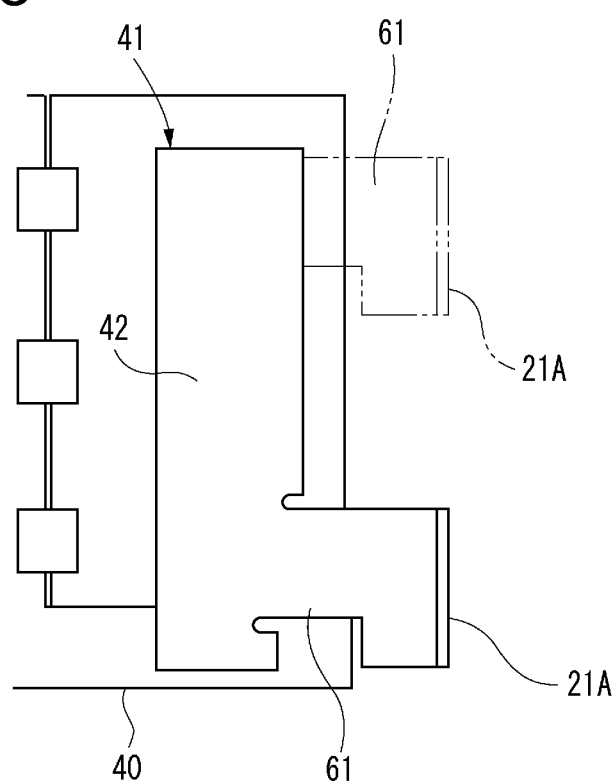
FIG. 26 is a plan view of the bus bar for explaining the relation between a formation position of the side extension portion of the bus bar and an inclination angle with which the magnetic flux density becomes the maximum.

FIG. 20 is a perspective view of a circuit substrate received in a housing for explaining the fourth embodiment. FIG. 21 is a plan view of the circuit substrate received in the housing for explaining the fourth embodiment. FIG. 22 is a side view of the circuit substrate received in the housing for explaining the fourth embodiment. FIG. 23 is a plan view of the circuit substrate for explaining the direction of a current flowing into a bus bar and the direction of a magnetic field. FIG. 24 is a schematic plan view of the bus bar and a magnetic sensor for explaining a mounting position of the magnetic sensor. FIG. 25 is a graph showing an increase/decrease rate of the magnetic flux density of a magnetic field occurring in a side extension portion of the bus bar. FIG. 26 is a plan view of the bus bar for explaining the relation between a formation position of the side extension portion of the bus bar and an inclination angle with which the magnetic flux density becomes the maximum.

As shown in FIGS. 20 and 21, in a switch box 10 according to the fourth embodiment, an end portion of one bus bar 41 is bent upward and the upward bent portion is used as a connection terminal portion 21A. In addition, the other bus bar 41 has a side extension portion 61 in its one end side. The side extension portion 61 extends perpendicularly to a longitudinal direction of the bus bar 41. An end portion of the side extension portion 61 is bent upward, and the upward bent portion is used as a connection terminal portion 21B. Thus, one connection terminal portion 21A is exposed in a front portion 11a of the housing 11 while the other connection terminal portion 21B is exposed in one side portion of the housing 11. In the switch box 10 according to the fourth embodiment, a magnetic sensor 46 mounted on the circuit substrate 40 is disposed in a position under the side extension portion 61 formed in the other bus bar 41, as shown in FIGS. 21 and 22.

In the switch box 10 according to the fourth embodiment, the direction of a magnetic field generated when a current flows into a cable C disposed in the longitudinal direction of the bus bar 41 is different by 90° from the direction of a magnetic field generated due to a current flowing into the side extension portion 61.

Here, in a bus bar 41 provided with no side extension portion 61, the direction of a magnetic field generated due to a current flowing into the cable C parallel to the bus bar 41 is the same as the direction of a magnetic field generated due to a current flowing into the bus bar 41. Therefore, the magnetic fields generated due to the currents flowing into the cable C and the bus bar 41 are cancelled with each other or added to each other. Accordingly, when a sufficient distance between the cable C and the magnetic sensor 46 cannot be secured or when a current higher than expected flows into the cable C, the magnetic field generated due to the current flowing into the cable C affects the magnetic field generated due to the current flowing into the bus bar 41. Thus, determination accuracy of an overcurrent into switching elements 45 based on a signal issued from the magnetic sensor 46 is lowered so that the switching elements 45 cannot be protected surely from the overcurrent. Or when an overcurrent is determined though it is not a true overcurrent, there arises a problem that the switching elements 45 may be turned OFF frequently. Thus, there is a fear that the power supply system may be affected seriously.

On the other hand, in the switch box 10 according to the fourth embodiment, the direction of the magnetic field generated when the current flows into the cable C disposed in the longitudinal direction of the bus bar 41 is different by about 90° from the direction of the magnetic field generated due to the current flowing into the side extension portion 61. Accordingly, the magnetic flux density generated due to the current flowing into the side extension portion 61 and in a direction different by about 90° from the direction of the magnetic field generated due to the current flowing into the cable C can be detected excellently by the magnetic sensor 46 provided in the position under the side extension portion 61.

Incidentally, when the cable C is disposed perpendicularly to the longitudinal direction of the bus bar 41, the magnetic sensor 46 is disposed on a side under the bus bar 41 provided with no side extension portion 61. Thus, the direction of a magnetic field generated when a current flows into the cable C disposed perpendicularly to the bus bar 41 is different by about 90° from the direction of a magnetic field generated due to a current flowing into the bus bar 41. Accordingly, the magnetic flux density generated, due to the current flowing into the bus bar 41, in a direction different by about 90° from the direction of the magnetic field generated due to the current flowing into the cable C can be detected excellently by the magnetic sensor 46 provided in a position under the bus bar 41.

Thus, according to the switch box 10 according the fourth embodiment, the mounting position of the magnetic sensor 46 is selected between the side extension portion 61 of the bus bar 41 having the side extension portion 61 and the circuit substrate 40 or between the bus bar 41 having no side extension portion 61 and the circuit substrate 40, for example, in accordance with the direction of an external magnetic field generated due to a current flowing into the cable C arranged in the vicinity of the switch box 10. Accordingly, the influence of the external magnetic field can be reduced so that overcurrent detection accuracy can be enhanced.

In the switch box of the power supply system, large-diameter connecting cables for applying large currents are generally connected to connection terminal portions 21A and 21B of the bus bars 41. Accordingly, when an installation space of a vehicle where the switch box 10 is installed is narrow, there is a case where it may be impossible to connect the connecting cables to the connection terminal portions 21A and 21B or it may be difficult to route the connecting cables if the connection terminals 21A and 21B are provided in a front portion 11a which is one and the same surface of the housing 11. Accordingly, for example, irregular terminals each having a large size and a complicated shape have to be used as cable side terminals. This may cause increase in cost.

On the other hand, in the switch box 10 according to the fourth embodiment, the position of the connection terminal portion 21B of the bus bar 41 having the side extension portion 61 is different from the position of the connection terminal portion 21A of the bus bar 41 having no side extension portion 61. Accordingly, it is not necessary to use irregular terminals each having a large size and a complicated shape or it is not necessary to change external appearance of the housing 11 largely. Therefore, the cost can be prevented from increasing. Thus, the switch box 10 can be easily installed in an installation space of a vehicle which varies in size from one vehicle kind to another. In addition, large-diameter connecting cables can be connected to the connection terminal portions 21A and 21B.

Thus, according to the fourth embodiment, it is possible to provide a switch box having connection terminal portions 21A and 21B so that lowering of overcurrent detection accuracy due to an external magnetic field can be suppressed, the degree of freedom in routing connecting cables can be enhanced, and the switch box can be further compatible with various kinds of vehicles.

In the case where the side extension portion 61 is formed in the end portion of the bus bar 41 as shown in FIG. 23, a current I may pass through a mounting portion 42 from the connection terminal portion 21B to flow into the switching elements 45 of the circuit substrate 40. In this case, the current flows into the side extension portion 61 in a direction (arrow D2 in FIG. 23) inclined by an inclination angle θ with respect to a direction (arrow D1 in FIG. 23) parallel to the side extension portion 61. Therefore, a magnetic field generated due to the current flowing into the side extension portion 61 becomes the maximum in a direction (arrow E2 in FIG. 23) inclined by the inclination angle θ with respect to a direction (arrow E1 in FIG. 23) perpendicular to the side extension portion 61.

Accordingly, as shown in FIG. 24, it is preferable that the magnetic sensor 46 is mounted on the circuit substrate 40 so that the magnetic sensor 46 can be disposed in the direction (arrow E2 in FIG. 24) inclined by the inclination angle θ with respect to the direction (arrow E1 in FIG. 24) perpendicular to the side extension portion 61. In this manner, the magnetic flux density detected by the magnetic sensor 46 becomes large. Accordingly, an error in detection of the current value flowing into the bus bar 41 can be reduced so that an overcurrent can be determined with higher accuracy.

Here, as shown in FIG. 25, an increase/decrease rate of the magnetic flux density of the magnetic field generated due to the current flowing into the side extension portion 61 becomes the peak in the direction (arrow E2 in FIG. 23) inclined by the inclination angle θ with respect to the direction (arrow E1 in FIG. 23) perpendicular to the side extension portion 61. Therefore, when the magnetic sensor 46 is mounted on the circuit substrate 40 so that the magnetic sensor 46 can be disposed in the direction (arrow E1 in FIG. 24) perpendicular to the side extension portion 61, increase/decrease of the magnetic flux density due to mounting displacement (rotation displacement θ±X) becomes large (see F1 in FIG. 25) and variation of detection accuracy of the current value becomes large.

On the other hand, when the magnetic sensor 46 is mounted on the circuit substrate 40 so that the magnetic sensor 46 can be disposed in the direction (arrow E2 in FIG. 23) inclined by the inclination angle θ with respect to the direction (arrow E1 in FIG. 23) perpendicular to the side extension portion 61, increase/decrease of the magnetic flux density due to displacement (rotation displacement θ±X) of the mounting position of the magnetic sensor 46 with respect to the circuit substrate 40 becomes as small as possible (see F2 in FIG. 25) so that variation of detection accuracy of the current value can be suppressed. Accordingly, the detection accuracy can be improved.

Incidentally, as shown in FIG. 26, for example, the formation position of the side extension portion 61 formed on one end side of the bus bar 41 may be changed to the other end side of the bus bar 41 (see a two-dot chain line in FIG. 26). The inclination angle θ with which the magnetic flux density of the magnetic field generated due to the current flowing into the side extension portion 61 is the maximum changes in accordance with the formation position of the side extension portion 61 in the bus bar 41. Accordingly, it is preferable that the magnetic sensor 46 mounted on the circuit substrate 40 under the side extension portion 61 is rotated in plane so that the magnetic sensor 46 can be disposed to be matched with the inclination angle θ changing in accordance with the formation position of the side extension portion 61.

Incidentally, although the magnetic sensor 46 for performing current detection is provided in one of the paired bus bars 41 in the aforementioned embodiment, the magnetic sensor 46 may be provided in each of the bus bars 41.

In addition, although one magnetic sensor 46 is provided in one bus bar 41 in the aforementioned embodiment, magnetic sensors 46 the number of which is the same as that of the switching elements 45 may be provided to monitor overcurrents in the switching elements 45 respectively based on detection signals issued from the magnetic sensors 46.

Incidentally, the invention is not limited to the aforementioned embodiments but any modification, improvement, etc. can be made on the invention suitably. In addition thereto, the material, shape, dimensions, number, disposed place, etc. of each constituent member in the aforementioned embodiments are not limited but may be set desirably as long as the invention can be achieved.

Here, the aforementioned characteristics of the embodiments of the switch box and the overcurrent preventing method according to the invention will be summarized and listed briefly in the following paragraphs [1] to [6] respectively.

[1] A switch box including:
a circuit substrate (40) that has a conductor pattern;
a switching element (45) that is mounted on the circuit substrate;
a bus bar (41) that includes a current input and output portion (connection terminal portion 21A, 21B) formed at one end thereof and a mounting portion (42) formed at the other end thereof, the mounting portion (42) being connected to the conductor pattern of the circuit substrate so as to be electrically conducted to the switching element through the conductor pattern; and
a magnetic sensor (46) that is mounted on the circuit substrate to detect a magnetic field generated due to a current flowing into the bus bar,
wherein the magnetic sensor is disposed in a gap (G) formed between the circuit substrate and the bus bar.

[2] The switch box according to the paragraph [1], wherein the switching element and other switching element are mounted on the circuit substrate;
wherein the mounting portion of the bus bar has a plurality of branch connection portions (44) that are electrically conducted to the switching element and the other switching element through the conductor pattern; and
wherein the magnetic sensor is disposed so as to be closer to the current input and output portion than the branch connection portions.

[3] The switch box according to the paragraph [1] or [2], wherein the bus bar has a bent portion (57) that is provided between the current input and output portion and the mounting portion and bent perpendicularly to a direction parallel to the current input and output portion and the mounting portion; and
wherein the magnetic sensor is disposed in a vicinity of the bent portion.

[4] The switch box according to any one of the paragraphs [1] to [3], further including:
a plurality of shield plates (55) that are formed of a magnetic material and that cover the magnetic sensor, the bus bar and the circuit substrate.

[5] The switch box according to the paragraph [1] or [2], wherein the bus bar and other bus bar are mounted on the circuit substrate so as to be disposed in parallel with one another; and
wherein at least one of the bus bar and the other bus bar has a side extension portion (61) that extends in a direction perpendicular to an extension direction of the at least one of the bus bar and the other bus bar and an end portion of the side extension portion is the current input and output portion.

[6] An overcurrent preventing method in a switch box including:
a circuit substrate that has a conductor pattern;
a switching element that is mounted on the circuit substrate;
a bus bar that has a current input and output portion formed at one end thereof and a mounting portion formed at the other end thereof, the mounting portion being connected to the conductor pattern of the circuit substrate so as to be electrically conducted to the switching element through the conductor pattern; and
a magnetic sensor that is mounted on the circuit substrate to detect a magnetic field generated due to a current flowing into the bus bar,
the overcurrent preventing method including:
blocking a current from flowing into the switching element, when the current having a current value equal to or greater than a predetermined value flows into the bus bar for at least a predetermined time based on a detection result output from the magnetic sensor.

What is claimed is:

1. A switch box comprising:
   a circuit substrate that comprises a conductor pattern;
   a switching element that is mounted on the circuit substrate;
   a bus bar that comprises a current input and output portion formed at one end thereof and a mounting portion formed at the other end thereof, the mounting portion being connected to the conductor pattern of the circuit substrate so as to be electrically conducted to the switching element through the conductor pattern; and
   a magnetic sensor that is mounted on the circuit substrate to detect a magnetic field generated due to a current flowing into the bus bar,
   wherein the magnetic sensor is disposed in a gap formed between the circuit substrate and the bus bar,
   wherein the mounting portion of the bus bar comprises a plurality of branch connection portions which are electrically conducted to the switching element through the conductor pattern, and
   wherein the magnetic sensor is disposed so as to be closer to the current input and output portion than the branch connection portions.

2. The switch box according to claim 1, wherein the bus bar comprises a bent portion which is provided between the current input and output portion and the mounting portion and bent perpendicularly to a direction parallel to the current input and output portion and the mounting portion; and
   wherein the magnetic sensor is disposed in a vicinity of the bent portion.

3. The switch box according to claim 1, further comprising:
   a plurality of shield plates that are comprised of a magnetic material and that cover the magnetic sensor, the bus bar and the circuit substrate.

4. The switch box according to claim 1, wherein the bus bar and other bus bar are mounted on the circuit substrate so as to be disposed in parallel with one another; and
   wherein at least one of the bus bar and the other bus bar has a side extension portion which extends in a direction perpendicular to an extension direction of the at least one of the bus bar and the other bus bar and an end portion of the side extension portion is the current input and output portion.

5. An overcurrent preventing method in a switch box comprising:
   a circuit substrate that comprises a conductor pattern;
   a switching element that is mounted on the circuit substrate;
   a bus bar that comprises a current input and output portion formed at one end thereof and a mounting portion formed at the other end thereof, the mounting portion being connected to the conductor pattern of the circuit substrate so as to be electrically conducted to the switching element through the conductor pattern; and
   a magnetic sensor that is mounted on the circuit substrate to detect a magnetic field generated due to a current flowing into the bus bar,
   wherein the mounting portion of the bus bar comprises a plurality of branch connection portions which are electrically conducted to the switching element through the conductor pattern, and
   wherein the magnetic sensor is disposed so as to be closer to the current input and output portion than the branch connection portions,
   the overcurrent preventing method comprising:
   blocking a current from flowing into the switching element, when the current having a current value equal to or greater than a predetermined value flows into the bus bar for at least a predetermined time based on a detection result output from the magnetic sensor.

6. The switch box according to claim 1, wherein each of the plurality of branch connection portions has a plurality of terminals.

* * * * *